United States Patent [19]
Gilchrist et al.

[11] Patent Number: 5,183,389
[45] Date of Patent: Feb. 2, 1993

[54] ANTI-ROCK BLADE TANG

[75] Inventors: Alan R. Gilchrist, Fairfield; Edward M. Duran; Dennis P. Dry, both of Cincinnati, all of Ohio; Robert R. Berry, Portville, N.Y.

[73] Assignee: General Electric Company, Cincinnati, Ohio

[21] Appl. No.: 828,278

[22] Filed: Jan. 30, 1992

[51] Int. Cl.$^5$ ............................................. F01D 5/30
[52] U.S. Cl. ................... 416/193 A; 416/248; 416/500
[58] Field of Search ............... 416/219 R, 248, 500, 416/193 A

[56] References Cited

U.S. PATENT DOCUMENTS

| | | | |
|---|---|---|---|
| 2,317,338 | 4/1943 | Rydmark | 416/500 |
| 2,990,156 | 6/1961 | Marshall et al. | 416/500 |
| 3,801,222 | 4/1974 | Violette | 416/248 |
| 3,867,069 | 2/1975 | Bussell | 416/212 |
| 3,891,351 | 6/1975 | Norbut | 416/219 |
| 3,892,612 | 7/1975 | Carlson et al. | 156/150 |
| 4,017,832 | 4/1977 | Salemme et al. | 416/248 |
| 4,102,603 | 7/1978 | Smith et al. | 416/244 A |
| 4,142,836 | 3/1979 | Glenn | 416/193 A |
| 4,309,145 | 1/1982 | Viola | 415/170 |
| 4,451,204 | 5/1984 | Pask | 416/248 |
| 4,451,205 | 5/1984 | Honda et al. | 416/219 |
| 4,536,129 | 8/1985 | Jankot | 416/193 A |
| 4,595,340 | 6/1986 | Klassen et al. | 416/248 |
| 4,645,425 | 2/1987 | Morrison, Jr. | 416/215 |
| 4,872,812 | 10/1989 | Hendley et al. | 416/190 |
| 4,917,574 | 4/1990 | Dodd et al. | 416/500 |
| 4,940,389 | 7/1990 | Luxenburger | 416/220 R |

FOREIGN PATENT DOCUMENTS 1012927  8/1957  Fed. Rep. of Germany ... 416/219 R

*Primary Examiner*—John T. Kwon
*Attorney, Agent, or Firm*—Jerome C. Squillaro

[57] ABSTRACT

The present invention provides a rotor blade capable of being axially loaded in slots on a gas turbine engine rotor and particularly suited for use on turbine disks. The blade has a generally axially extending dovetail root which is effective for being loaded into a rotor disk slot between adjacent disk posts. Anti-rock tangs are disposed radially outward of the root and tangentially extend from the shank and are generally linear in the axial direction. The anti-rock tangs are effective to engage the radially outwardmost facing surfaces of the adjacent dovetail posts between which is disposed the associated dovetail slot.

6 Claims, 2 Drawing Sheets

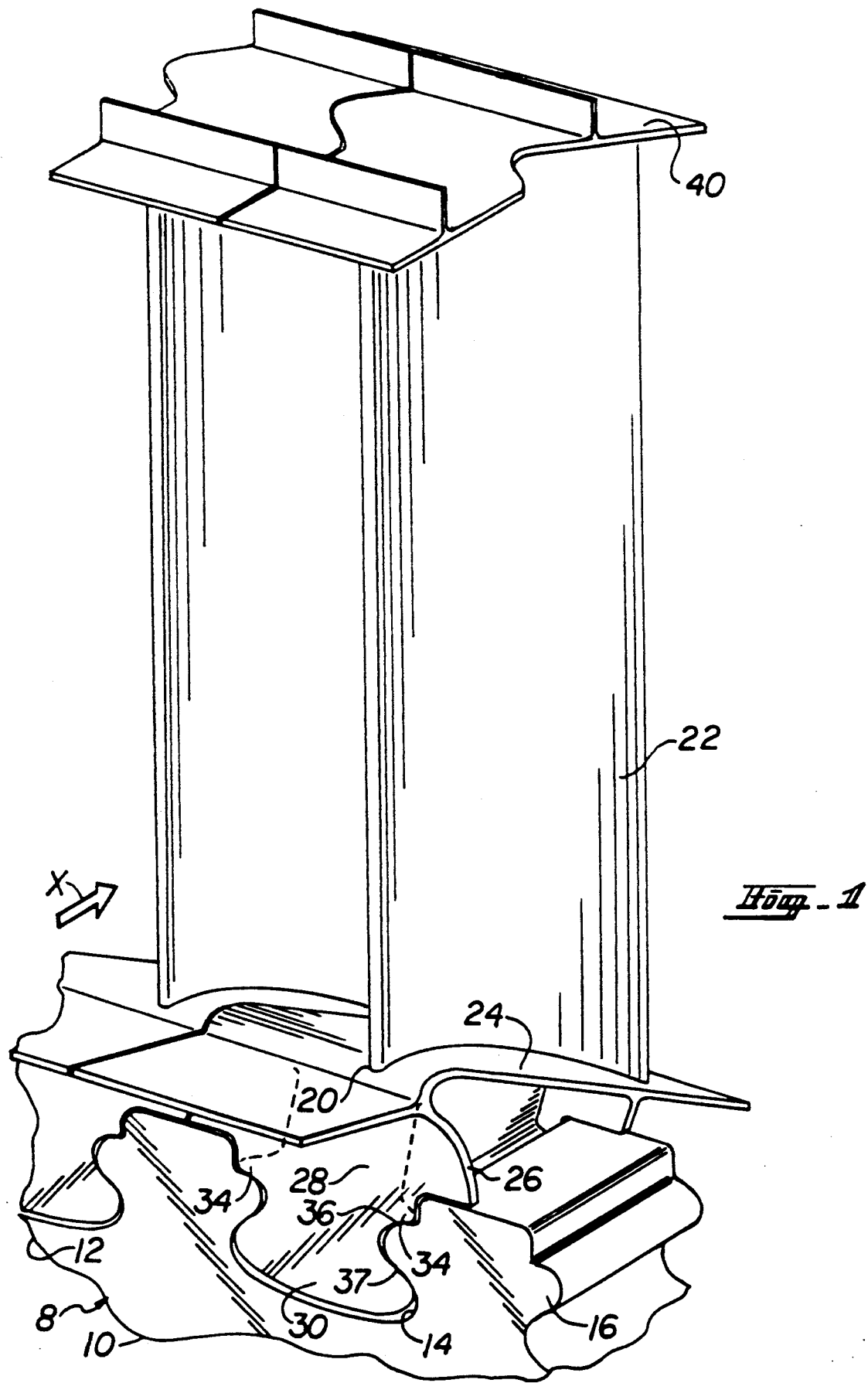

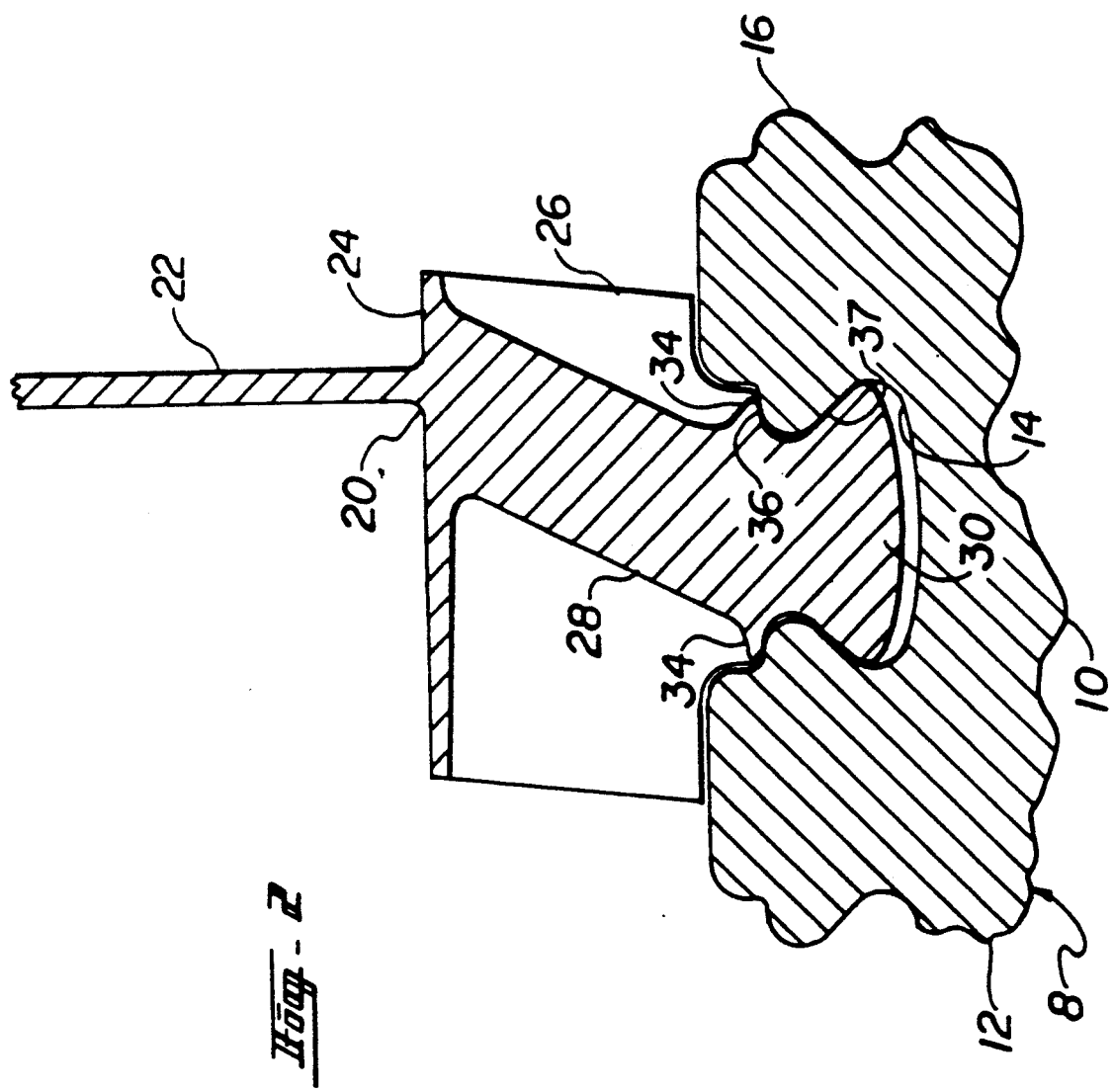

ANTI-ROCK BLADE TANG

BACKGROUND OF THE INVENTION

1. Field of the Invention

This invention relates to axial flow machine rotating blades and specifically to root tangs used to reduce rocking of the blades.

2. Description of Related Art

A typical turbine rotor assembly of a gas turbine engine has a plurality of rotor or more particularly turbine blades extending radially outward across a working fluid flowpath. Typical turbine blades generally include an airfoil section mounted on a platform which in turn is held radially outward of a blade root section by a blade shank. The blade is normally mounted in the rim of a rotor disk by its root interlockingly engaging a slot cut in the rim. The blade may have a mid-span shroud as is typical of fan blades or a tip shroud such as may be found in low pressure turbine blades.

One typical type of rotor blade has an axially extending root that is curvilinear in form and referred to as a dovetail root. The root is designed to be axially slid into a matching conforming slot referred to as a dovetail slot. Formed between the slots are posts in the rim of the disk which are adapted to engage and hold tangentially extending lobes or tangs of the dovetail root by the centrifugal force developed during engine operation.

Single tang dovetail and multiple tang fir tree roots are used throughout the turbomachinery industry as a means of attaching blades to disks. Multiple tang fir tree roots have radially stacked sets of tangentially and axially extending tangs and, due to their basic design and tolerance, minimize the amount of blades axial and tangential rocking in its slot due to the upper and lower tangs acting as a moment restraint. Single tang dovetail roots, however, limit axial and tangential rotation only when the dovetail curvilinear cross-section form comes in contact with its corresponding disk dovetail slot surface, or adjacent blade platforms or shroud edges come in contact, or the blade shank contacts the disk, all of which result in larger tolerance stacks therefore increasing the amount of blade rotation.

Minimizing the amount of blade tangential rocking is important to minimize dovetail wear. Particularly important to blade designs having mid-span or tip shrouds is the need to minimize the amount of the disengaging of adjacent blade shrouds and shroud disengagement is a function of the amount of dovetail axial and tangential rocking motion.

The problem is particularly acute at low rotational turbine rotor speeds where the centrifugal forces holding the tangs against their corresponding inwardly facing dovetail slot surfaces is marginal at best and the blades can rock or angle over in the tangential direction.

SUMMARY OF THE INVENTION

Therefore in order to minimize the amount of single tang rotor blade rocking for blades designed to be axially slid into slots between dovetail posts of rotor disks the present invention provides axially extending anti-rock tangs that are effective to engage tops or radially outwardmost facing surfaces of the corresponding dovetail posts.

The preferred embodiment of the present invention provides, in radially inward serial relationship, a rotor blade having an airfoil radially extending outward from a blade platform which is supported by a shank that is connected to an axially extending and linear root that is effective for mounting and loading the blade in the axial direction into axially extending and linear dovetail slots formed between posts of a rotor disk. The root includes at its radially inward end tangentially extending axially linear root tangs having a cross-sectional shape essentially conforming to the slot in the rotor disk and effective for holding the blade to the disk during engine operation. Anti-rock tangs are disposed radially outward of the root and tangentially extend from the shank and are generally linear in the axial direction. The anti-rock tangs are effective to engage the radially outwardmost facing surfaces of the adjacent dovetail posts between which is disposed the associated dovetail slot.

A more particular embodiment provides an airfoil having a tangentially extending tip shroud segment effective to sealing engage adjacent tip shroud segment during engine operation.

ADVANTAGES

Among the advantages provided by the rotor blade of the present invention is the ability to prevent tangential rocking without the need for multiple tang roots or fir trees. This permits the use of dovetail roots and slots which requires shorter posts and smaller and lighter weight disks than would otherwise be used. Another advantage of the present invention is that it minimizes the amount of dovetail wear and reduces the amount of mid-span or tip shroud disengagement between corresponding shrouds of adjacent blades.

BRIEF DESCRIPTION OF THE DRAWINGS

The foregoing aspects and other features of the invention are explained in the following description, taken in connection with the accompanying drawings where:

FIG. 1 is a perspective cutaway view of a portion of an aircraft gas turbine engine low pressure rotor turbine rotor disk illustrating a rotor blade in accordance with the preferred embodiment of the present invention.

FIG. 2 is a cross-sectional view of the rotor blade and a portion of the disk in FIG. 1.

DETAILED DESCRIPTION OF THE INVENTION

Referring to FIG. 1, a portion of a gas turbine engine rotor 8, typical of a section of the low pressure turbine is shown having a disk 10 including a circumscribing rim 12 with a plurality of circumferentially disposed generally axially extending blade slots 14, in the form of dovetail slots, cut therethrough forming dovetail posts 16 therebetween.

Dovetail slot 14 is designed to receive turbine blade 20 having an airfoil 22 extending radially outward from a blade platform 24 having a protective skirt 26. Partially hidden from view and so indicated by dashed line is a blade shank 28 which supports platform 24 at its radially outward end and at its other end is connected to a dovetail blade root 30. Root 30 conforms to the shape of and is designed to be received into dovetail slot 14. Shank 28 angled in the axial direction so as to support the convergent shaped platform so that it properly defines the fluid work path past the blade.

Note that blade slots, blades, and or its roots, shanks, and platforms are often not formed exactly parallel to the engine's axis or centerline but may be somewhat angled in the circumferential or tangential direction for dynamic and structural reasons. Such and direction are considered generally axially extending for the purpose of this patent application.

Referring to FIG. 2, anti-rock tangs 34 are disposed radially outward of root 30, tangentially extend from shank 28, and are generally linear in the axial direction. Anti-rock tangs 34, of which there are two for each blade, are formed and effective to engage corresponding radially outwardmost facing surfaces 36 of adjacent dovetail posts 16 between which is disposed associated dovetail slot 14. Anti-rock tangs 34 have a half lobe somewhat angular shaped cross-section. Alternatively anti-rock tang 34 may be described as an angular protrusion which is designed to engage and react forces off of only radially outwardmost facing surfaces of adjacent posts. This can be contrasted to the full lobe rounded cross-section of the single tang dovetail root 30 which is designed to engage and react forces off of only radially inward facing surfaces 37 of adjacent posts. This feature is a weight reducing feature because the single tang root design of dovetail slots and roots eliminate the need for a full second tang on the root and a matching slot on the post which are used to reduce rocking of the blade. In the present invention only the dovetail root and slots must be designed to withstand the stresses generated by the centrifugal forces of the spinning blades. This feature also permits more simple dovetail slot and root designs to be used instead of more complicated multi-tang root fir tree designs that are more complex, more difficult to machine, and are heavier and more expensive than blades and disk assemblies of the present invention.

Referring again back to FIG. 1, a blade shroud in the form of a tip shroud 40 is disposed at the radially outward end of airfoil 22 and together with platform 24 radially confines the working fluid. Adjacent shrouds 40 have interlocking platforms profiles and therefore it is important to minimize rocking so as to provide good sealing at the interface between adjacent shroud elements. The present invention contemplates the use of anti-rock tang features as claimed herein for turbine, compressor, and fan rotor blades having single tang roots and for blades with mid-span shrouds as well as ones with tip shrouds.

While the preferred embodiment of our invention has been described fully in order to explain its principles, it is understood that various modifications or alterations may be made to the preferred embodiment without departing from the scope of the invention as set forth in the appended claims.

We claim:

1. A rotor blade capable of being axially loaded in generally axially extending slots circumferentially disposed between adjacent posts in the rotor of a gas turbine engine, said blade comprising:

an airfoil radially extending outward from a blade platform, a shank supporting said platform at a radially outward end of said shank, said shank connected, at its radially inward end to an axially extending and axially linear single tang dovetail root that is effective for loading the rotor blade in the axial direction into the slots between the posts, anti-rock tangs tangentially extending from said shank disposed between said platform and said root, and said anti-rock tangs being linear in the axial direction, effective to engage the radially outwardmost facing surfaces of the corresponding post.

2. A rotor blade as claimed in claim 1, further comprising shroud segments tangentially extending form tangential facing sides of said airfoil and effective to sealing engage shroud segments of adjacent blades during engine operation.

3. A rotor blade as claimed in claim 2, wherein said shroud segments are disposed at the radially outer tip of said air foil so as to form tips shroud segments for the blade.

4. A gas turbine engine rotor assembly comprising:

a rotor disk having a plurality of generally axially extending slots circumferentially disposed between adjacent posts in a rim of said rotor disk, a plurality of rotor blades disposed in said slots, said blades capable of being axially loaded in said slots each of said blades comprising:

an airfoil radially extending outward from a blade platform, a shank supporting said platform at a radially outward end of said shank, said shank connected, at its radially inward end to an axially extending and axially linear single tang dovetail root that is effective for loading the rotor blade in the axial direction into the slots between the posts, anti-rock tangs tangentially extending from said shank disposed between said platform and said single tang dovetail root, and said anti-rock tangs being linear in the axial direction, effective to engage the radially outwardmost facing surfaces of the corresponding dovetail post.

5. A gas turbine engine rotor assembly as claimed in claim 4, further comprising shroud segments tangentially extending from tangential facing sides of said airfoil and effective to sealing engage shroud segments of adjacent blades during engine operation.

6. A gas turbine engine rotor assembly as claimed in claim 5, wherein said shroud segments are disposed at the radially outer tip of said air foil so as to form tips shroud segments for the blade.

* * * * *